March 1, 1932.  E. F. BACON  1,848,052
TEMPERATURE COMPENSATED SPEEDOMETER
Filed Nov. 30, 1927
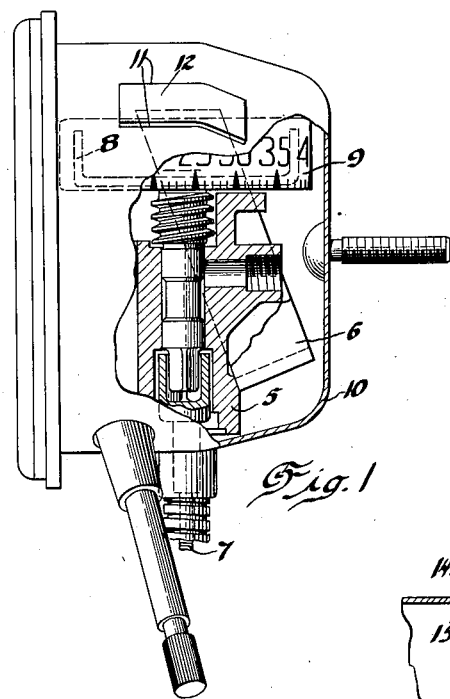
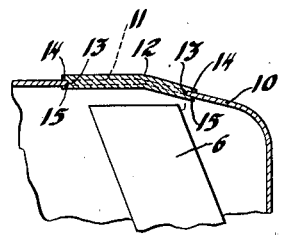
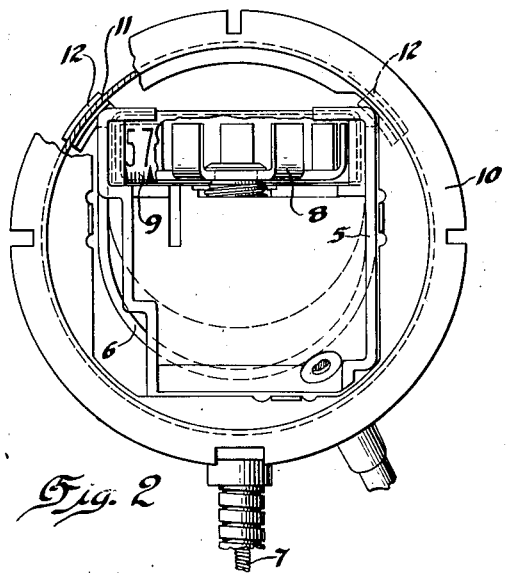
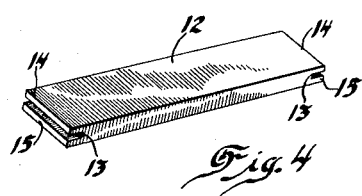
Inventor
Elbridge F. Bacon Patented Mar. 1, 1932

1,848,052

UNITED STATES PATENT OFFICE

ELBRIDGE F. BACON, OF FLINT, MICHIGAN, ASSIGNOR TO A C SPARK PLUG COMPANY, OF FLINT, MICHIGAN, A CORPORATION OF MICHIGAN

TEMPERATURE COMPENSATED SPEEDOMETER

Application filed November 30, 1927. Serial No. 236,866.

This invention relates, generally, to magnetic measuring instruments, specifically, to speedometers of this type, and, especially, to means for making the indications of such instruments independent of variations in temperature.

Speedometers of the type mentioned consist essentially of a magnet and an armature either or both of which are adapted to be driven, directly or indirectly, from the shaft whose speed is to be measured, and a pivotally mounted speed cup or disk positioned in the rotating magnetic field and adapted to be displaced from its position of rest an angular distance proportional to the speed of rotation of the rotating member or members.

An instrument of the general type described above gives quite accurate speed indications when operated at the temperature at which it is calibrated. But if it is operated at temperatures appreciably above that at which it is calibrated, the speed indications will be considerably lower than the true, and if operated at temperatures appreciably below the calibration temperature, the speed indications will be considerably higher than the true. This error is caused by the fact that while the strength of the magnetic field between the poles of the magnet and the rotor remains substantially constant within the range of temperatures to be considered, the electrical resistance of the material of which the speed cup is made increases very considerably with rise in temperature and decreases proportionately with a decrease in temperature. This variation in resistance results in a decrease, if the temperature is above that at which the instrument was calibrated, or an increase, if the temperature is below that at which the instrument was calibrated, in the strength of the eddy currents induced in the speed cup by the moving lines of force between the magnet and the rotor, when the latter is being driven below or above that which would be induced if the rotor were being driven at the same speed at the temperature at which the instrument was calibrated; and since the deflection of the speed cup from its position of rest depends on the strength of the eddy currents flowing therein (the strength of the magnetic field remaining constant), the speed indication given thereby will be high at temperatures below, and low at temperatures above, that at which the instrument is calibrated.

It is obvious that the indications of an instrument of the type described will be unaffected by temperature changes if neither the electrical resistance of the speed cup nor the strength of the magnetic field passing through the speed cup varies with changes in temperature. Since, as has been stated, the strength of the magnetic field passing through the speed cup is practically constant throughout the temperature range to be considered, this condition can be fulfilled by making the speed cup of a material or combinations of materials having a temperature resistance coefficient approaching zero. Such materials exist, but their electrical resistance is so high as to make their use in an instrument of this type impractical.

For the reason given above, it has become universal practice to make the speed cups of instruments of the type described of a material having low electrical resistance and the accompanying relatively high temperature coefficient of resistance. The indications of such an instrument will be unaffected by temperature changes if the strength of the magnetic field passing through the speed cup thereof is caused to vary in such a manner as to counteract the changes in resistance of the speed cup. This, of course, means that the strength of the magnetic field passing through the speed cup must vary directly with the resistance of the speed cup. Several means of accomplishing this end have been proposed.

If a piece of magnetic material is positioned so as to shunt part of the magnetic field of the magnet away from the speed cup, and the piece of magnetic material has a negative temperature coefficient of permeability, the result will obviously be that as the temperature increases less of the flux from the magnet will flow into the shunt and more through the speed cup, and as the temperature decreases, more of the flux from the magnet will flow into the shunt and less into the speed cup. It is obvious that the use of such a shunt will tend to compensate the instrument for temperature changes.

Several magnetic materials having an appreciable negative temperature coefficient of permeability are known, among which are certain alloys of nickel and iron and certain alloys of nickel and copper. The shape and slope of the temperature-permeability curves of both of these alloys vary considerably with their percentage composition. The particular alloy which should be used as a shunt with any given instrument to make its indications independent of the temperature will, of course, depend upon the temperature-resistance characteristics of the material of which the speed cup or disc is made, and the amount of the alloy to be used will depend upon the strength of the magnet and the position of the shunt relative to the poles of the magnet.

It is an object of this invention to provide a temperature-compensated instrument of the class described.

More specifically, it is an object of the invention to provide in an instrument of the type described a magnetic shunt or shunts adjacent one or both poles of the magnet having such temperature-permeability characteristics as to counteract the effects of the variation in electrical resistance of the speed cup or disc on the indications of the instrument.

Other objects of the invention will be apparent from a perusal of the following description of the preferred embodiment of my invention, which is shown in the accompanying drawings, in which:

Figure 1 is a side elevation, with parts broken away and in section, of a speedometer in which is embodied my invention;

Figure 2 is a front elevation, with parts broken away, of the instrument shown in Figure 1 with the dial and bezel removed;

Figure 3 is a fragmentary view of the instrument shown in Figures 1 and 2, with parts broken away and in section, showing the position of one of the compensators relative to the adjacent pole of the magnet; and Figure 4 is a perspective view of the shunt or compensator.

In the drawings, the reference character 5 indicates a frame of non-magnetic material to which is rigidly fastened in any suitable manner a permanent horseshoe magnet 6. Journalled in the frame, located between the poles of the magnet and adapted to be rotated by a rotating shaft of the vehicle through the flexible shaft 7, is the rotor 8 which is preferably made of low carbon steel. The speed cup 9, which is preferably made of an aluminum-magnesium alloy, is also pivotally mounted on the frame and is provided with a circumferential flange or skirt which is located between the rotor and the poles of the magnet and carries the speed indicating characters. A hair spring (not shown) which is connected to the speed cup and frame in the usual or any desired manner is provided to return the speed cup to its position of rest when movement of the vehicle ceases. The frame and the parts mounted thereon are all enclosed in a case 10 of iron or soft, low carbon steel through which the flexible shaft 7 projects. The poles of the magnet are, as shown in the drawings, located in close proximity to the case 10.

At two points, one substantially opposite each pole of the magnet, the case is cut away to provide the slots 11, in each of which is positioned a shunt or compensator 12 of a magnetic material having a negative temperature coefficient of permeability. With the aluminum-magnesium speed cup used it has been found that an alloy containing approximately 70% nickel and 30% copper gives satisfactory results, reducing the error in the indications of the instrument caused by temperature changes to a negligible amount.

Each compensator or shunt 12 is provided on each of its longitudinal ends with a slot 13 bounded on its upper and lower sides by tongues or extensions 14 and 15, respectively. To secure the shunt to the case, the shunt is first bowed between its ends until its greatest over-all length is substantially equal to that of the slot 11 in the case, and is then positioned in the slot and straightened until its shape corresponds with that of the portion of the case in which it is situated, at which time the tongues or extensions 14 and 15 will overlie and underlie, respectively, the portions of the case adjacent each end of the slot 11, and the shunt will thereby be firmly secured to the case. It is obvious that the tongues or extensions may be provided on the portions of the case adjacent the ends of the slots instead of on the shunt.

It is well known that a considerable portion of the magnetic flux in an instrument of the type described is wasted by being shunted through the iron case. It is also well known that the magnetic permeability of alloys such as those mentioned as suitable for use as shunts is much lower than that of iron. When the shunts are positioned in the case, as shown in the drawing, at points adjacent the poles of the magnet which are the points at which the greater amount of the flux which is diverted from the speed cup ordinarily enters the casing, the most effective temperature compensation is obtained, and, moreover, less of the flux is wasted by shunting due to the relatively low permeability of the magnetic path provided by the alloy as compared with that which would be provided by the iron case if it were not replaced at the points mentioned by the shunts or compensators. This characteristic of the shunts or inserts permits the use of a heavier hair spring for returning the speed cup to its position of rest or the use of a weaker magnet to supply the same amount of magnetic flux to the speed cup.

In certain cases it may be desirable to use only one shunt in an instrument. In this event, the shunt may be positioned adjacent either pole of the magnet or one shunt extending from adjacent one pole to adjacent the other pole may be used.

It is to be understood that, although I have shown and described a specific construction and have mentioned suitable materials, this has been done, not with a view to limiting the invention thereto, but merely by way of example.

Though I have described my invention as applied to a speedometer, it is to be understood that it may equally well be applied to many other magnetic measuring instruments and that the scope of the invention is defined and limited only by the appended claims.

I claim:

1. In a magnetic measuring instrument, a magnet, a member in the magnetic field of the magnet and adapted to be influenced thereby to effect indications of the instrument, a case enclosing the magnet and the member and having an opening therein, and means in the opening in the case adapted to shunt varying proportions of the flux of the magnet away from the member, whereby the effect of temperature changes on the indications of the instrument will be diminished.

2. In a magnetic measuring instrument, a magnet, a case enclosing the magnet and having an opening therein, and a magnetic shunt in the opening in the case.

3. In a magnetic measuring instrument, a magnet, a case enclosing the magnet and having an opening therein, and a magnetic shunt having an appreciable temperature coefficient of magnetic permeability in the opening in the case.

4. In a magnetic measuring instrument, a magnet, a case enclosing the magnet and having an opening therein adjacent one pole of the magnet, and a magnetic shunt in the opening in the case.

5. In a magnetic measuring instrument, a magnet, a case enclosing the magnet and having an opening therein adjacent one pole of the magnet, and a magnetic shunt having an appreciable temperature coefficient of magnetic permeability in the opening in the case.

6. In a magnetic measuring instrument, a magnet, a case enclosing the magnet and having therein a plurality of openings, one adjacent each pole of the magnet, and a magnetic shunt in each of the openings.

7. In a magnetic measuring instrument, a magnet, a case of magnetic material enclosing the magnet, means for shunting varying proportions of the flux of the magnet including a member of appreciably lower magnetic permeability than the material of which the case is made replacing a portion of the case whereby the effect of temperature changes on the indications of the instrument and the amount of flux wasted by shunting through the case are both diminished.

8. In a magnetic measuring instrument, a magnet, a case of magnetic material enclosing the magnet, means for shunting varying proportions of the flux of the magnet including a member of magnetic material of appreciably lower magnetic permeability than the material of which the case is made and having an appreciable temperature coefficient of magnetic permeability replacing a portion of the case whereby the effect of temperature changes on the indications of the instrument and the amount of flux wasted by shunting through the case are both diminished.

9. In a magnetic measuring instrument, a magnet, a case of magnetic material enclosing the magnet, means for shunting varying proportions of the flux of the magnet including a member of magnetic material of appreciably lower magnetic permeability than the material of which the case is made and having an appreciable negative temperature coefficient of magnetic permeability replacing a portion of the case whereby the effect of temperature changes on the indications of the instrument and the amount of flux wasted by shunting through the case are both diminished.

10. In a magnetic measuring instrument, a magnet, a case of magnetic material enclosing the magnet, means for shunting varying proportions of the flux of the magnet including a member of magnetic material of appreciably lower magnetic permeability than the material of which the case is made replacing a portion of the case adjacent one pole of the magnet whereby the effect of temperature changes on the indications of the instrument and the amount of flux wasted by shunting through the case are both diminished.

11. In a magnetic measuring instrument, a magnet, a case of magnetic material enclosing the magnet, means for shunting varying proportions of the flux of the magnet including a member of magnetic material of appreciably lower magnetic permeability than the material of which the case is made and having an appreciable temperature coefficient of magnetic permeability replacing a portion of the case adjacent one pole of the magnet whereby the effect of temperature changes on the indications of the instrument and amount of flux wasted by shunting through the case are both diminished.

12. In a magnetic measuring instrument, a magnet, a case of magnetic material enclosing the magnet, means for shunting varying proportions of the flux of the magnet including a member of magnetic material of appreciably lower magnetic permeability than the material of which the case is made and having an appreciable negative temperature coefficient of magnetic permeability replacing a portion of the case adjacent one pole of the magnet whereby the effect of temperature changes on the indications of the instrument and amount of flux wasted by shunting through the case are both diminished.

13. In a magnetic measuring instrument, a magnet, a case of magnetic material enclosing the magnet and having an opening therein adjacent one of the poles of the magnet, and an insert of material of lower magnetic permeability than the material of which the case is made in the opening in the case and means securing the insert to the case including a slot in one of said members in which a portion of the other of said members is located.

14. In a magnetic measuring instrument, a magnet, a case of magnetic material enclosing the magnet and having an opening therein adjacent one of the poles of the magnet, and an insert of material of lower magnetic permeability than the material of which the case is made in the opening in the case and means securing the insert to the case including a slot in the insert in which a portion of the case adjacent one end of the opening is located.

15. In a magnetic measuring instrument, a magnet, a case of magnetic material enclosing the magnet and having an opening therein adjacent one of the poles of the magnet, and an insert of material of lower magnetic permeability than the material of which the case is made in the opening in the case and means securing the insert to the case including a slot in one end of the insert in which a portion of the case adjacent one end of the opening is located and a slot in the other end of the insert in which a portion of the case adjacent the other end of the opening is located.

In testimony whereof I affix my signature.

ELBRIDGE F. BACON.